United States Patent
Kobayashi (10) Patent No.: US 9,674,018 B2
(45) Date of Patent: Jun. 6, 2017

(54) MOBILE WIRELESS TERMINAL AND BUFFER CONTROL METHOD

(71) Applicant: FUJITSU LIMITED, Kawasaki-shi, Kanagawa (JP)

(72) Inventor: Noboru Kobayashi, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 51 days.

(21) Appl. No.: 14/685,767

(22) Filed: Apr. 14, 2015

(65) Prior Publication Data
US 2015/0382220 A1    Dec. 31, 2015

(30) Foreign Application Priority Data
Jun. 27, 2014  (JP) ................. 2014-133045

(51) Int. Cl.
| | |
|---|---|
| H04L 1/00 | (2006.01) |
| H04L 27/26 | (2006.01) |
| H04L 5/00 | (2006.01) |
| H04W 28/02 | (2009.01) |
| H04L 12/835 | (2013.01) |
| H04W 72/12 | (2009.01) |

(52) U.S. Cl.
CPC ............ *H04L 27/26* (2013.01); *H04L 5/0057* (2013.01); *H04L 47/30* (2013.01); *H04W 28/0263* (2013.01); *H04W 72/1231* (2013.01); *H04W 72/1221* (2013.01)

(58) Field of Classification Search
None
See application file for complete search history.

(56) References Cited

U.S. PATENT DOCUMENTS

| | | | |
|---|---|---|---|
| 2010/0234035 A1 | 9/2010 | Fujishima et al. | |
| 2011/0075679 A1* | 3/2011 | Yui ................. | H04L 1/1825 370/412 |
| 2014/0105142 A1* | 4/2014 | Nogami ........... | H04W 72/0413 370/329 |
| 2014/0204884 A1* | 7/2014 | Bucknell ......... | H04L 47/10 370/329 |
| 2014/0293970 A1* | 10/2014 | Damnjanovic ... | H04L 5/0078 370/336 |
| 2014/0321376 A1* | 10/2014 | Damnjanovic ... | H04W 72/1215 370/329 |

FOREIGN PATENT DOCUMENTS

| | | |
|---|---|---|
| JP | 2010-011063 | 1/2010 |
| JP | 2010-213007 | 9/2010 |

\* cited by examiner

*Primary Examiner* — Kibrom T Hailu
(74) *Attorney, Agent, or Firm* — Fujitsu Patent Center (57) ABSTRACT

A mobile wireless terminal includes a communication processor. The communication processor includes an internal memory, a CQI estimating unit, an RBG table creating unit, and a DMPX. A second buffer is arranged in the internal memory. The CQI estimating unit measures the quality of channels for each channel. The RBG table creating unit specifies the plurality of channels in descending order of quality of the channels within the range in which the sum of the amount of data received via the channels is equal to or less than the capacity of the second buffer. The DMPX stores, in the second buffer, data received via the plurality of channels specified by the RBG table creating unit.

8 Claims, 10 Drawing Sheets

| ID | STORAGE DESTINATION FLAG |
|---|---|
| 2 | 0 |
| 4 | 1 |
| 9 | 1 |
| 10 | 0 |
| ... | ... |
| 21 | 1 |

MOBILE WIRELESS TERMINAL AND BUFFER CONTROL METHOD

CROSS-REFERENCE TO RELATED APPLICATION

This application is based upon and claims the benefit of priority of the prior Japanese Patent Application No. 2014-133045, filed on Jun. 27, 2014, the entire contents of which are incorporated herein by reference.

FIELD

The embodiment discussed herein is related to a mobile wireless terminal and a buffer control method.

BACKGROUND

In the Long Term Evolution (LTE, registered trademark), a communication method known as Orthogonal Frequency Division Multiplexing (OFDM) is used. In OFDM, a large amount of communication is possible by using multiple single carriers each of which has orthogonal relationship. Each of the single carriers is called a sub-carrier (SC) and a group of large number of SCs is called a component carrier (CC). When multiple users communicate with each other, simultaneous communication performed by multiple users is implemented by allocating, to each of the users, a resource block (RB) including SCs that are suitable for the communication for the users selected from among SCs in a CC.

In OFDM, a mobile wireless terminal estimates the state of a channel used for a wireless transmission path by using a reference signal (RS) including already known data sent from a base station. Then, the mobile wireless terminal performs, on a signal received from the base station, an equalization process, a demodulation process, a decoding process, and the like. These processes are usually performed by the period (in LTE, 1 millisecond) called by a subframe.

Furthermore, the mobile wireless terminal measures the state of a channel used for a wireless transmission path for each SC and reports, to the base station, channel quality indicator (CQI) that indicates the quality of the estimated wireless transmission path at a predetermined unit of frequency. The base station sends, to the mobile wireless terminal on the basis of the CQI reported from the mobile wireless terminal, data by using an RB that includes SCs that have higher quality.

Patent Document 1: Japanese Laid-open Patent Publication No. 2010-11063

Patent Document 2: Japanese Laid-open Patent Publication No. 2010-213007

However, because RSs sent from the base station are allocated in a subframe in a distributed manner, channel estimation by using the RSs is difficult to be performed until the entirety of the subframe is received. Furthermore, because the equalization process, the demodulation process, or the like are not performed unless the channel estimation has been completed, signals received during this period are stored in a reception buffer.

If the number of RBs allocated to data transmission becomes great, an amount of data received in a subframe duration becomes great. Furthermore, in LTE-advanced that is the revision of LTE, carrier aggregation (CA) in which communication is performed by using multiple CCs (a maximum of 5 CCs) or multiple input multiple output (MIMO) in which communication is performed by using multiple antennas is used. With this method, in LTE-advanced, an amount of data that can be received by the mobile wireless terminal is further increased and an amount of data to be held until the channel estimation has been completed becomes further increased. Furthermore, in LTE-advanced, because a process of removing interference received from another base station is further added, the timing at which a process, such as a demodulation process or the like, can be started is further delayed and thus an amount of data needs to be held is further increased.

It is conceivable that data received before the completion of the channel estimation is held in an internal memory in a communication processor that controls the wireless communication. However, if an amount of the internal memory that is mounted on the communication processor is increased, a cost of the communication processor is increased. To avoid this problem, it is conceivable to increase, by arranging an external memory, such as an SDRAM or the like, outside the communication processor, a memory area that stores therein the reception data until the channel estimation has been completed. However, electrical power needed to read and write data used for an access to the external memory arranged outside the communication processor is greater than that used for an access to a memory that is arranged inside the communication processor. Consequently, in the receiving process, the electrical power consumed by the mobile wireless terminal is increased.

SUMMARY

According to an aspect of an embodiment, a mobile wireless terminal includes a communication processor. The communication processor includes an internal memory, a measuring unit, and a specifying unit. A first buffer is arranged in the internal memory. The measuring unit measures quality of channels for each channel. The specifying unit specifies a plurality of channels in descending order of quality of the channels within a range in which a sum of an amount of data received via the channels is equal to or less than a capacity of the first buffer. The storing unit stores, in the first buffer, data received via the plurality of channels specified by the specifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The application is not limited to the embodiments described below. Furthermore, the embodiments can be appropriately used in combination as long as processes do not contradict.

[a] First Embodiment

Configuration of a Mobile Wireless Terminal 10

Figure 1:
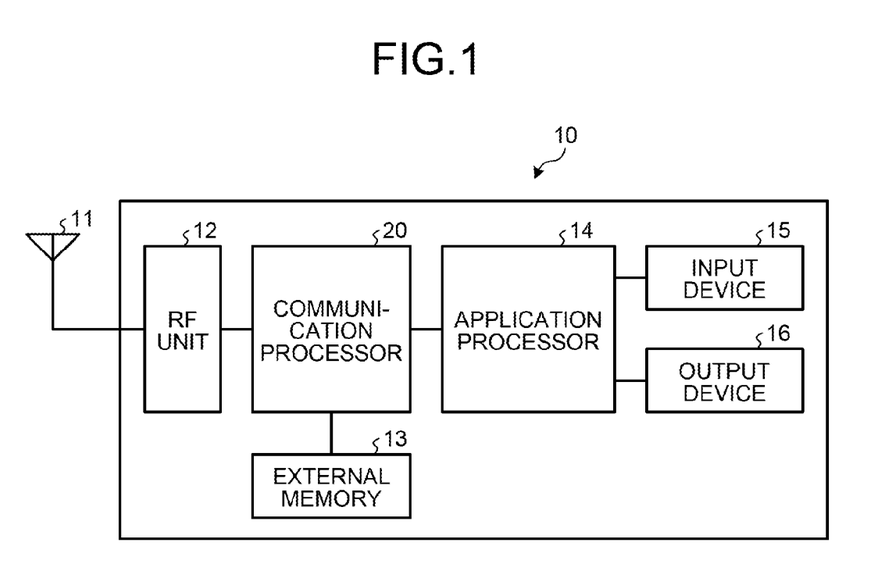
FIG. 1 is a block diagram illustrating an example of a mobile wireless terminal.

FIG. 1 is a block diagram illustrating an example of a mobile wireless terminal 10. The mobile wireless terminal 10 includes an antenna 11, an RF unit 12, an external memory 13, an application processor 14, an input device 15, an output device 16, and a communication processor 20.

The RF unit 12 down converts a radio signal received from a base station via the antenna 11 to a base band signal from the frequency of a carrier wave to the baseband frequency. Then, the RF unit 12 sends, to the communication processor 20, a digital signal obtained by performing quadrature demodulation and analog to digital (A/D) conversion on the base band signal. Furthermore, after the RF unit 12 performs digital to analog (D/A) conversion on the digital signal received from the communication processor 20, the RF unit 12 performs quadrature modulation. Then, the RF unit 12 up converts the signal after the quadrature modulation to the radio signal from the baseband frequency to the frequency of a carrier wave and then sends the signal from the antenna 11 at predetermined electrical power.

The communication processor 20 demodulates and decodes the base band signal received from the RF unit 12; performs an error correction or the like; and outputs the signal to the application processor 14. Furthermore, the communication processor 20 encodes the data received from the application processor 14, performs digital modulation on the encoded data; and outputs the modulated digital signal to the RF unit 12. In the embodiment, the external memory 13, such as a synchronous dynamic random access memory (SDRAM) or the like, is connected to the communication processor 20.

The application processor 14 executes, on the basis of an operation or data received from a user via the input device 15, such as a keypad, a touch panel, or the like, various application programs, such as a VoIP process, a web browser, or the like. Then, the application processor 14 displays the data by the application program being executed on the output device 16, such as a liquid crystal display (LCD) or the like, and outputs audio in accordance with the created data from the output device 16, such as a speaker or the like.

In the embodiment, the communication processor 20 is implemented by, for example, a single CPU; however, as another embodiment, the communication processor 20 may also be implemented by a combination of two or more CPUs, DSPs, or the like. Furthermore, in the embodiment, the communication processor 20 and the application processor 14 are arranged in the mobile wireless terminal 10 as separate processors; however, the communication processor 20 and the application processor 14 may also be implemented by a single processor.

Furthermore, in the embodiment, a description will be given of an example of the mobile wireless terminal 10 that is used in the LTE communication method in which a signal that is wirelessly transmitted from a base station by using a single CC is received by a single antenna 11. However, the embodiment may also be used for the mobile wireless terminal 10 that is used in the LTE-advanced system in which signals that are wirelessly transmitted from a base station by using a plurality of CCs (for example, a maximum of five CCs) are received by using the several numbers of the antennas 11, for example, four antennas.

Configuration of the Communication Processor 20

Figure 2:
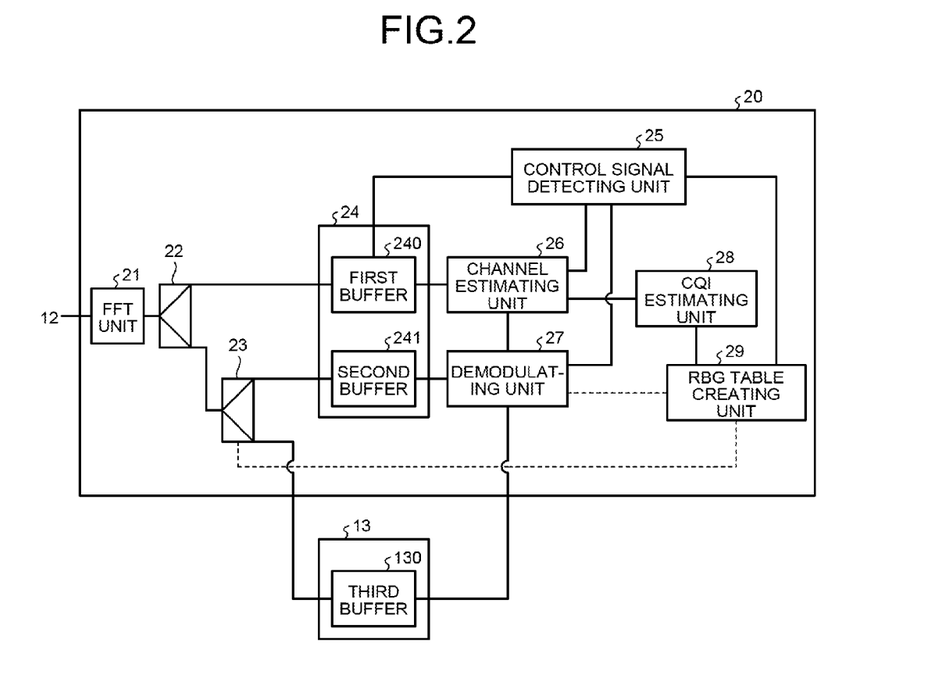
FIG. 2 is a block diagram illustrating an example of a communication processor.

FIG. 2 is a block diagram illustrating an example of a communication processor 20. The communication processor 20 includes a fast Fourier transform (FFT) unit 21, a demultiplexer (DMPX) 22, a DMPX 23, and an internal memory 24. Furthermore, the communication processor 20 includes a control signal detecting unit 25, a channel estimating unit 26, a demodulating unit 27, a CQI estimating unit 28, and a resource block group (RBG) table creating unit 29. In the internal memory 24, a first buffer 240 and a second buffer 241 are arranged.

Furthermore, FIG. 2 illustrates a part of the function of a receiving process, such as the function of a process performed in layer 1, performed by the communication processor 20 according to the embodiment. The communication processor 20 also performs a process to be performed in layer 2, such as a sending process, a receiving process, or the like; however, in FIG. 2, these functions are not illustrated. In a description below, a part of the function of the receiving process, such as the function of the process performed in layer 1, will be mainly described.

The FFT unit 21 performs the FFT process on the received signals that have been received from the base station via the RF unit 12 and then outputs the processed received signal to the DMPX 22. The DMPX 22 extracts, for each subframe, from among the received signals after the FFT process, control data included in a physical downlink control channel (PDCCH) and in an RS and stores the control data in the first buffer 240. Then, the DMPX 22 outputs, to the DMPX 23, user data of the received signal from which control data in the PDCCH and the RS are removed.

Figure 3:
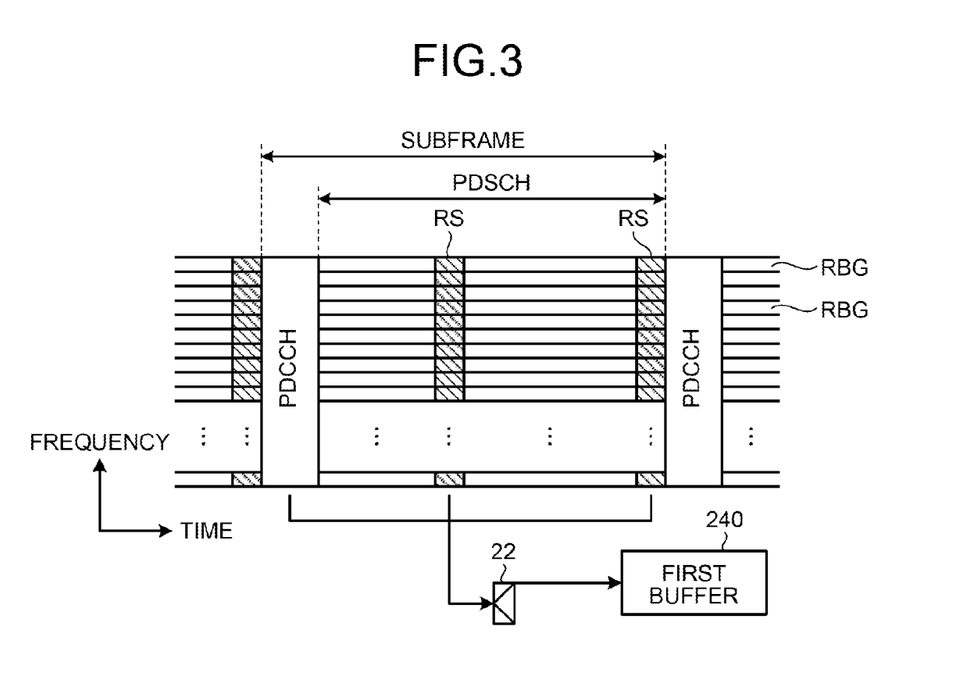
FIG. 3 is a schematic diagram illustrating an example of a method of storing control data.

FIG. 3 is a schematic diagram illustrating an example of a method of storing control data. As illustrated in FIG. 3, for a predetermined number of symbols starting from the top subframe (in LTE-advanced, a maximum of 3 symbols from the top), a PDCCH that includes the control data is sent. Furthermore, subsequent to the PDCCH, a physical downlink shared channel (PDSCH) that includes user data is sent. Each of the pieces of the user data is allocated to an RB in a PDSCH. An RS is allocated to each of predetermined positions in a PDCCH and a PDSCH.

For example, as illustrated in FIG. 3, the DMPX 22 extracts, for each subframe, control data in a PDCCH and an RS from among the received signals after the FFT process. Then, the DMPX 22 stores the control data included in the extracted PDCCH and the RS in the first buffer 240.

In LTE, for example, 12 SCs that are adjacent to an interval of, for example, 15 k Hz are defined as a single RB and, for example, four RBs are defined as an RBG. If a single CC is the bandwidth of, for example, 20 MHz, for example, 1200 SCs are included in the CC. Furthermore, for example, 100 RBs are included in a single CC. Furthermore, for example, 25 RBGs are included in a single CC. Furthermore, data to be sent to the mobile wireless terminal 10 is sent to the mobile wireless terminal 10 from a base station via an RB that is allocated to the mobile wireless terminal 10.

The channel estimating unit 26 calculates, for all of the SCs, a channel estimated value that indicates the state of a channel used for a wireless transmission path on the basis of the cross correlation between the RS data stored in the first buffer 240 and data related to already known signals. Then, the channel estimating unit 26 outputs the calculated channel estimated value to the control signal detecting unit 25, the demodulating unit 27, and the CQI estimating unit 28.

The control signal detecting unit 25 demodulates and decodes, by using the channel estimated value calculated by the channel estimating unit 26, the control data included in a PDCCH stored in the first buffer 240. In the control data in the PDCCH, identification information on the RB that has been allocated to transmission of data to the mobile wireless terminal 10 is included. The identification information on the RB that is included in the control data and that has been allocated to the transmission of data to the mobile wireless terminal 10 is an example of allocation information.

The control signal detecting unit 25 extracts, from the decoded control data, identification information on an RB allocated to transmission of data that is sent to the mobile wireless terminal 10. Then, the control signal detecting unit 25 outputs the extracted identification information related to the RB to the demodulating unit 27 and the RBG table creating unit 29. Furthermore, if data has not been transmitted from the base station to the mobile wireless terminal 10, the identification information on the RB allocated to the transmission of data to the mobile wireless terminal 10 is not included in the decoded control data. If the identification information is not included in the decoded control data, the control signal detecting unit 25 sends, to the demodulating unit 27 and the RBG table creating unit 29, information indicating that no RB is allocated.

Here, the information indicating whether data to be sent to the mobile wireless terminal 10 is allocated to which RB in a subframe is included in the control data in the PDCCH that is included in the subject subframe. Accordingly, the RB that includes therein the data to be sent to the mobile wireless terminal 10 is not specified until the control data in the PDCCH is decoded. Therefore, for the RB to which the data to be sent to the mobile wireless terminal 10 is possibly sent, the subject RB is held in the second buffer 241 or a third buffer 130 until the decoding of the control data in the PDCCH is completed.

If an amount of data transmitted from the base station to the mobile wireless terminal 10 per unit time is increased, the number of RBs allocated to the transmission of data to the mobile wireless terminal 10 is increased and thus an amount of data to be held until the decoding of the control data in the PDCCH is completed. Furthermore, in LTE-advanced that is a revision version of LTE, CA in which communication is performed by using a maximum of 5 CCs or MIMO in which communication is performed by using multiple antennas is used. Consequently, in LTE-advanced, an amount of data received by a mobile wireless terminal is further increased and an amount of data to be held until the completion of the channel estimation is further increased. For example, if the mobile wireless terminal 10 receives data by using the antenna 11 the number of which is two and in which the bandwidth of a CC is 20 MHz, data received via 2400 SCs (1200 SCs for each of the antennas 11) are held.

Here, if all pieces of the data that are received until channel estimation has been completed are stored in the second buffer 241 in the communication processor 20, a large capacity of the internal memory 24 needs to be installed in the communication processor 20 and thus the cost of the communication processor 20 is increased. In order to avoid this state, in the mobile wireless terminal 10 according to the embodiment, the external memory 13 is arranged outside the communication processor 20 and some of the reception data is stored in the external memory 13 until the channel estimation has been completed.

Furthermore, the sum of the capacity of the first buffer 240 and the second buffer 241 in the internal memory 24 and the third buffer 130 in the external memory 13 is determined by, for example, the bandwidth of the OFDM communication performed by the mobile wireless terminal 10. Furthermore, each of preferable capacity of the second buffer 241 and the third buffer 130 is the capacity of storing data corresponding to equal to or greater than, for example, 1.5 times the duration of a subframe by taking into consideration a delay of a process that is performed by the channel estimating unit 26 or the like before the demodulation process is started.

Figure 4:
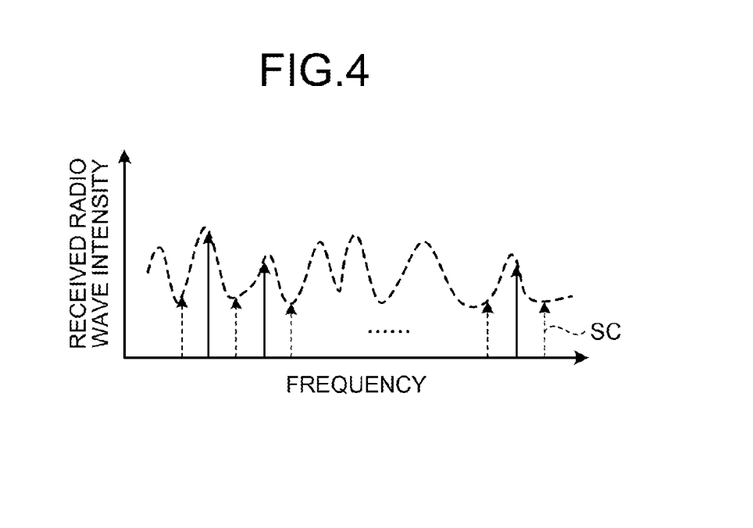
FIG. 4 is a schematic diagram illustrating an example of the frequency characteristic of a wireless transmission path.

The CQI estimating unit 28 measures, by using the channel estimated value calculated by the channel estimating unit 26, the quality of each of the wireless transmission paths (channels). FIG. 4 is a schematic diagram illustrating an example of the frequency characteristic of a wireless transmission path. The wireless transmission path has a frequency characteristic due to the factor of the fading. In FIG. 4, the arrow indicated by the solid line or the broken line represents SCs. As illustrated in FIG. 4, a SC sent from the base station varies, due to the frequency characteristic of the wireless transmission path, the radio wave intensity that is received by the mobile wireless terminal 10.

The CQI estimating unit 28 measures the frequency characteristic occurring in the wireless transmission path by using an RS that has been sent by using each SC. The mobile wireless terminal 10 reports, for example, for each RBG, the frequency characteristic measured by the CQI estimating unit 28 to the base station as CQI. The CQI is indicated by a value of, for example, 0 to 30. A larger value is allocated as the quality of a wireless transmission path is higher.

The base station sends data to the mobile wireless terminal 10 by using an RB included in the RBG that is reported from the mobile wireless terminal 10 indicating that the quality is high. In the example illustrated in FIG. 4, the base station sends data to the mobile wireless terminal 10 via the RB by using the high quality SC as indicated by, for example, the arrow by using the solid line.

In the embodiment, the CQI estimating unit 28 sends the CQI measured for each RBG to the RBG table creating unit 29. The RBG is an example of a channel. Furthermore, the CQI estimating unit 28 measures the CQI at an interval of, for example, a few milliseconds specified by the base station. However, the CQI estimating unit 28 may also measure the CQI at a timing, such as for each subframe, other than the interval specified by the base station.

Figure 5:
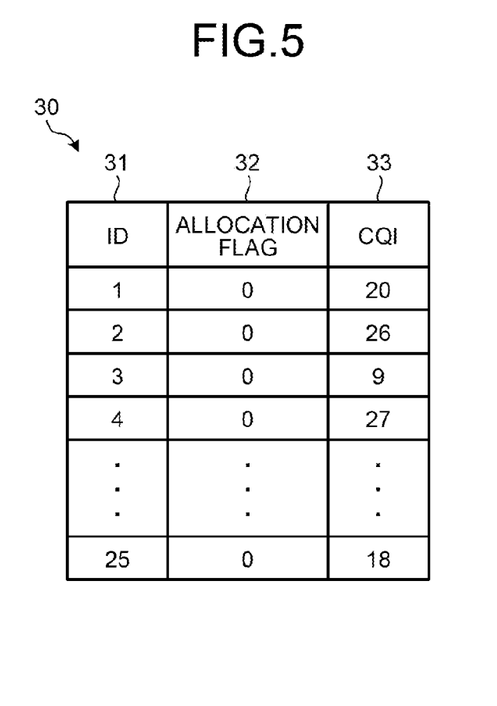
FIG. 5 is a schematic diagram illustrating an example of an association table.

The RBG table creating unit 29 receives identification information on an RB from the control signal detecting unit 25 and receives the CQI for each RBG from the CQI estimating unit 28. Then, the RBG table creating unit 29 creates, for example, an association table 30 illustrated in FIG. 5. FIG. 5 is a schematic diagram illustrating an example of the association table 30. The association table 30 stores therein, for example, as illustrated in FIG. 5, an ID 31 that is identification information on an RBG, an allocation flag 32, and a CQI 33, which are associated with each other.

In the allocation flag 32, information indicating whether an RB included in a corresponding RBG is allocated to transmission of data to the mobile wireless terminal 10 is stored. If the RBG is allocated to the transmission of the data to the mobile wireless terminal 10, for example, 1 is stored in the allocation flag 32. In contrast, no RBG is allocated to the transmission of the data to the mobile wireless terminal 10, for example, 0 is stored in the allocation flag 32. In the CQI 33, a value of the CQI for each RBG is stored.

If the RBG table creating unit 29 receives identification information related to an RB from the control signal detecting unit 25, the RBG table creating unit 29 stores information, such as 1, indicating that an RBG is allocated to the transmission of the data to the mobile wireless terminal 10 in the allocation flag 32 associated with the RBG that includes therein the subject RB in the association table 30. Furthermore, for an RBG that does not include identification information on the RB received from the control signal detecting unit 25, the RBG table creating unit 29 stores, in the allocation flag 32 associated with the subject RBG, information, such as 0, indicating that no RBG is allocated to the transmission of the data to the mobile wireless terminal 10.

Furthermore, if transmission of data from the base station to the mobile wireless terminal 10 by using an RB is not performed, such as before communication for receiving data is started, the control signal detecting unit 25 sends, to the RBG table creating unit 29, information indicating that an RB has not been allocated. In this case, the RBG table creating unit 29 stores, in all of the allocation flag 32 associated with the RBGs in the association table, information indicating that no RBG is allocated for the transmission of data to the mobile wireless terminal 10. Furthermore, the RBG table creating unit 29 associates the value of the CQI received from the CQI estimating unit 28 with the ID 31 of the RBG and then stores the associated value in the CQI 33 in the association table 30.

Figure 6:
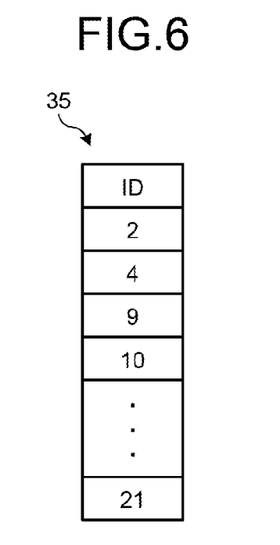
FIG. 6 is a schematic diagram illustrating an example of an RBG table.

Then, the RBG table creating unit 29 refers to the created association table 30 and determines whether which of the allocation flags 32 stores therein 1. None of the allocation flags 32 store therein 1, i.e., transmission of data from the base station to the mobile wireless terminal 10 is not performed, the RBG table creating unit 29 selects RBGs in descending order of the CQI values and accumulates an amount of data received via the selected RBG. Then, the RBG table creating unit 29 specifies identification information on multiple RBGs such that the cumulative value is the maximum within the range of the capacity of the second buffer 241. Then, the RBG table creating unit 29 creates an RBG table 35 that includes therein the identification information on the specified RBGs and sends the data in the created RBG table 35 to the DMPX 23 and the demodulating unit 27.

FIG. 6 is a schematic diagram illustrating an example of the RBG table 35. If transmission of data from the base station to the mobile wireless terminal 10 is not performed, identification information related to a predetermined number of RBGs is stored in the RBG table 35 in descending order of the CQI values within the range of the capacity of the second buffer 241. The identification information related to the RBGs in the RBG table 35 need not be stored in descending order of the CQI values in the RBG table 35.

In contrast, in the association table 30, the value of 1 is stored in one of the allocation flags 32, i.e., if transmission of data from the base station to the mobile wireless terminal 10 is performed, the RBG table creating unit 29 extracts the identification information on the RBG associated with 1 stored in the allocation flag 32. Then, the RBG table creating unit 29 sequentially selects, one by one, RBGs associated with the extracted identification information in descending order of the CQI value and accumulates an amount of data received via the selected RBGs.

If the cumulative value exceeds the capacity of the second buffer 241, the RBG table creating unit 29 specifies the identification information related to the multiple RBGs that are selected before the cumulative value exceeds the capacity of the second buffer 241. Then, the RBG table creating unit 29 creates the RBG table 35 (see FIG. 6) that includes therein the identification information related to the specified RBGs and sends the data in the created RBG table 35 to the DMPX 23 and the demodulating unit 27.

In this case, identification information related to a predetermined number of RBGs is stored, in the RBG table 35, in descending order of the CQI values from among RBGs that are associated with the allocation flag 32 of 1 within the range of the capacity of the second buffer 241. Furthermore, in this case, for the RBGs that are associated with the allocation flag 32 of 1, even if the value of the CQI is smaller than that of the RBG that is associated with the allocation flag 32 of 0, the identification information related to the RBG associated with the allocation flag 32 of 1 is stored, with priority, in the RBG table 35.

In contrast, if the cumulative value does not exceed the capacity of the second buffer 241 even if all of the RBGs associated with the allocation flag 32 of 1 are selected, the RBG table creating unit 29 sequentially selects, one by one, the RBGs in descending order of the CQI values from among the RBGs that are associated with the allocation flag 32 of 0. Then, the RBG table creating unit 29 further accumulates an amount of data received via the selected RBGs. If the cumulative value exceeds the capacity of the second buffer 241, the RBG table creating unit 29 specifies the identification information related to the multiple RBGs selected before the cumulative value exceeds the capacity of the second buffer 241. Then, the RBG table creating unit 29 creates the RBG table 35 (see FIG. 6) that includes therein the identification information related to the specified RBGs and then sends the data in the created RBG table 35 to the DMPX 23 and the demodulating unit 27.

In this case, the RBG table 35 stores therein identification information related to all of the RBGs associated with the allocation flag 32 of 1. Furthermore, the RBG table 35 stores therein identification information related to a predetermined number of RBGs in descending order of the CQI value within the free space that is obtained by subtracting the sum of the amount of data received from the RBGs that are associated with the allocation flag 32 of 1 from the capacity of the second buffer 241.

The DMPX 23 refers to the RBG table 35 received from the RBG table creating unit 29 and stores, in the second buffer 241, data in the RBG associated with the ID registered in the RBG table 35 from among the received signals from the DMPX 22. Furthermore, the DMPX 23 stores, in the third buffer 130 in the external memory 13, the data in the RBG whose ID is not registered in the RBG table 35 from among the received signals from the DMPX 22.

The demodulating unit 27 refers to the RBG table 35 and acquires, from the second buffer 241 or the third buffer 130, the data in the RBG that includes therein the RB that is associated with the identification information received from the control signal detecting unit 25. The demodulating unit 27 acquires, from the second buffer 241, the data in the RBG that is associated with the identification information registered in the RBG table 35. Furthermore, the demodulating unit 27 acquires, from the third buffer 130, the data in the RBG associated with the identification information that is not registered in the RBG table 35.

Then, the demodulating unit 27 demodulates the acquired data in the RBG by using the channel estimated value received from the channel estimating unit 26. Then, the demodulating unit 27 extracts, from among the pieces of the demodulated data in the RBG, the data in the RB associated with the identification information received from the control signal detecting unit 25, thereby the demodulating unit 27 acquires the data sent to the mobile wireless terminal 10.

Here, the base station allows the mobile wireless terminal 10 to measure, at a predetermined interval, the CQI for each RBG and to report the results. Then, on the basis of the CQI value reported from the mobile wireless terminal 10 and on the basis of the communication status of the other mobile wireless terminal 10, the base station determines an RB to be allocated to the transmission of data to the mobile wireless terminal 10. Consequently, There is a high probability that the RBG in which the value of the CQI reported from the mobile wireless terminal 10 to the base station is large, i.e., the quality is high, is allocated for the transmission of data that is performed from the base station to the mobile wireless terminal 10.

Figure 7:
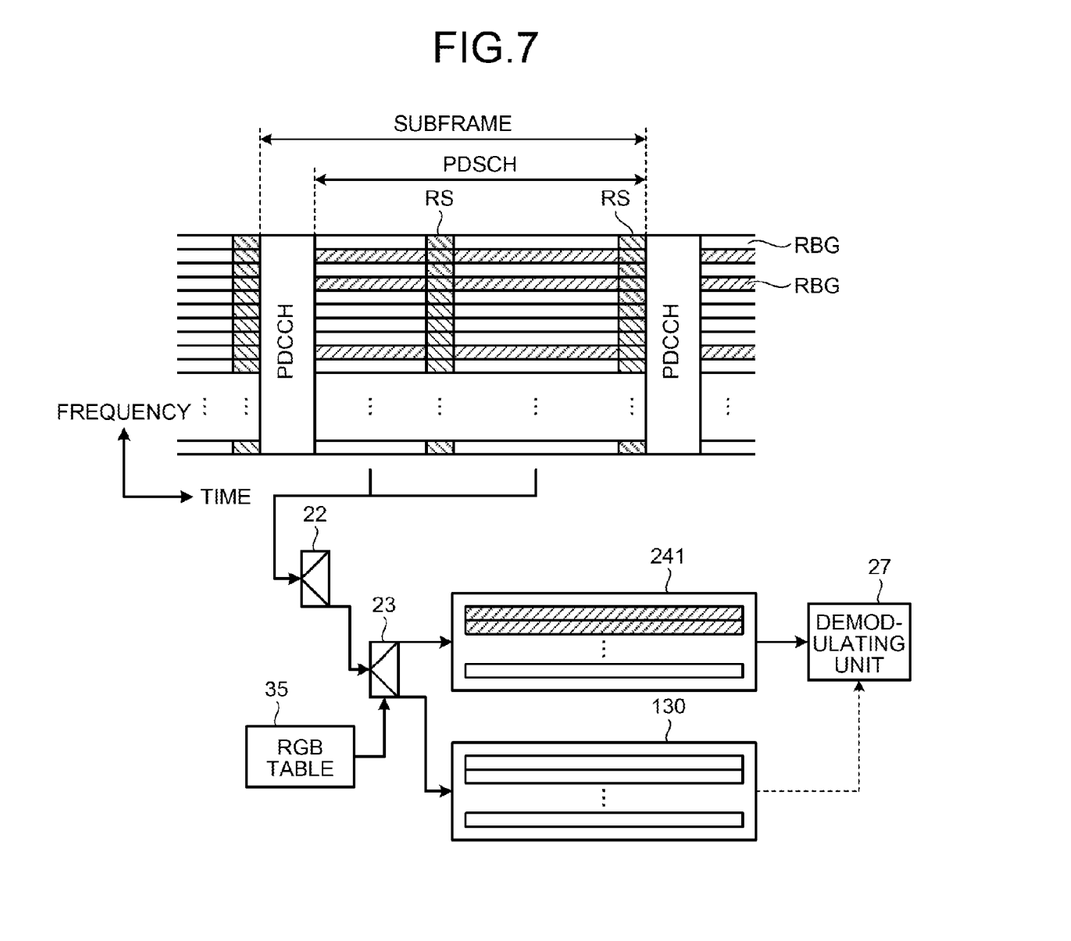
FIG. 7 is a schematic diagram illustrating an example of a method of storing reception data.

In the embodiment, if no information on the RB allocated to the transmission of data to the mobile wireless terminal 10 is present in a previous subframe, such as a case of communication being started, the RBG table 35 is created such that the identification information on a predetermined number of RBGs is included in descending order of the CQI values. Then, for example, as illustrated in FIG. 7, the DMPX 23 stores, in the second buffer 241 in the internal memory 24, the data received via the RBG in which the identification information is registered in the RBG table 35. Furthermore, for example, as illustrated in FIG. 7, the DMPX 23 stores, in the third buffer 130 in the external memory 13, the data received via the RBG in which the identification information is not registered in the RBG table 35.

FIG. 7 is a schematic diagram illustrating an example of a method of storing reception data. In FIG. 7, the RBGs indicated by using the hatching are the RBGs in each of which the RB that is allocated to the transmission of data to the mobile wireless terminal 10 is included. Because the RBG with a greater value of CQI is registered in the RBG table 35, the data that has been received via the RBG with a greater CQI value is stored in the second buffer 241. Then, there is a high probability that the RBG with a greater value of the CQI is allocated for data transmitted from the base station to the mobile wireless terminal 10.

Accordingly, for example, as illustrated in FIG. 7, there is a high possibility that the data in the RBG that includes therein the data to be sent to the mobile wireless terminal 10 (data in the RBG indicated by hatching illustrated in FIG. 7) is stored in the second buffer 241 in the internal memory 24. Consequently, when the data in the RBG that includes therein the data to be sent to the mobile wireless terminal 10 is acquired, the probability of the demodulating unit 27 accessing the third buffer 130 is reduced and the probability of the demodulating unit 27 accessing the second buffer 241 is increased. Consequently, the communication processor 20 can reduce electrical power consumed by the demodulating unit 27 accessing the third buffer 130 and thus the electrical power consumed by the mobile wireless terminal 10 can be reduced.

Figure 8:
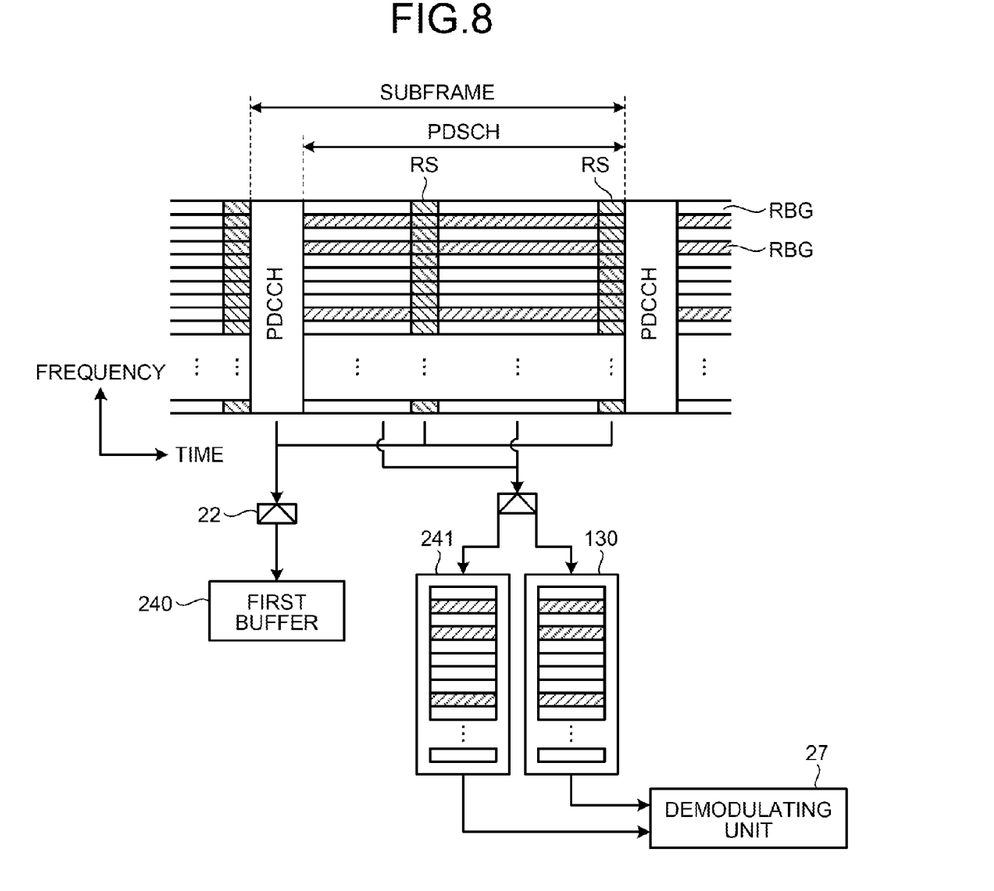
FIG. 8 is a schematic diagram illustrating a comparative example of a method of storing reception data.

Here, a case in which, for example, as illustrated in FIG. 8, all of the pieces of the data received via each of the RBGs for each subframe are stores in the second buffer 241 in the order the RBGs are received and, after the second buffer 241 becomes in a full state, the rest of the pieces of data are stored in the third buffer 130. FIG. 8 is a schematic diagram illustrating a comparative example of a method of storing reception data.

In the comparative example illustrated in FIG. 8, some of the data in each of the RBGs are arranged in the second buffer 241 and the third buffer 130 in a distributed manner. Accordingly, the demodulating unit 27 acquires data from each of the second buffer 241 and the third buffer 130 every time data to be sent to the mobile wireless terminal 10 is demodulated even if only a single piece of data is demodulated. Therefore, in the example illustrated in FIG. 8, an access by the demodulating unit 27 to the third buffer 130 always occurs every time data sent to the mobile wireless terminal 10 is demodulated, resulting in an increase in consumption of electrical power, which is difficult to avoid.

In contrast, with the mobile wireless terminal 10 according to the embodiment illustrated in FIG. 7, there is a high probability that the data in the RBG that is allocated to the transmission of data to the mobile wireless terminal 10 is stored in the second buffer 241. Consequently, it is possible to reduce the probability of the demodulating unit 27 accessing the third buffer 130 and thus it is possible to reduce the consumption of electrical power in the demodulation process performed by the mobile wireless terminal 10.

Furthermore, there is a low probability that the allocation of RBs is changed every time for each subframe and the allocation of RBs in a previous subframe is often continuously used. Consequently, there is a high possibility that the RB that has been allocated to the transmission of data to the mobile wireless terminal 10 in a certain subframe is also allocated to, in the subsequent subframe, the transmission of data to the mobile wireless terminal 10.

Consequently, in the embodiment, the RBGs that are associated with the allocation flag 32 of 1 in the association table 30 are registered in the RBG table 35 by giving priority higher than the RBG that is associated with the allocation flag 32 of 0 and that has greater CQI value. By doing so, the possibility that the data sent to the mobile wireless terminal 10 is stored in the second buffer 241 becomes high.

Operation of the Communication Processor 20

Figure 9:
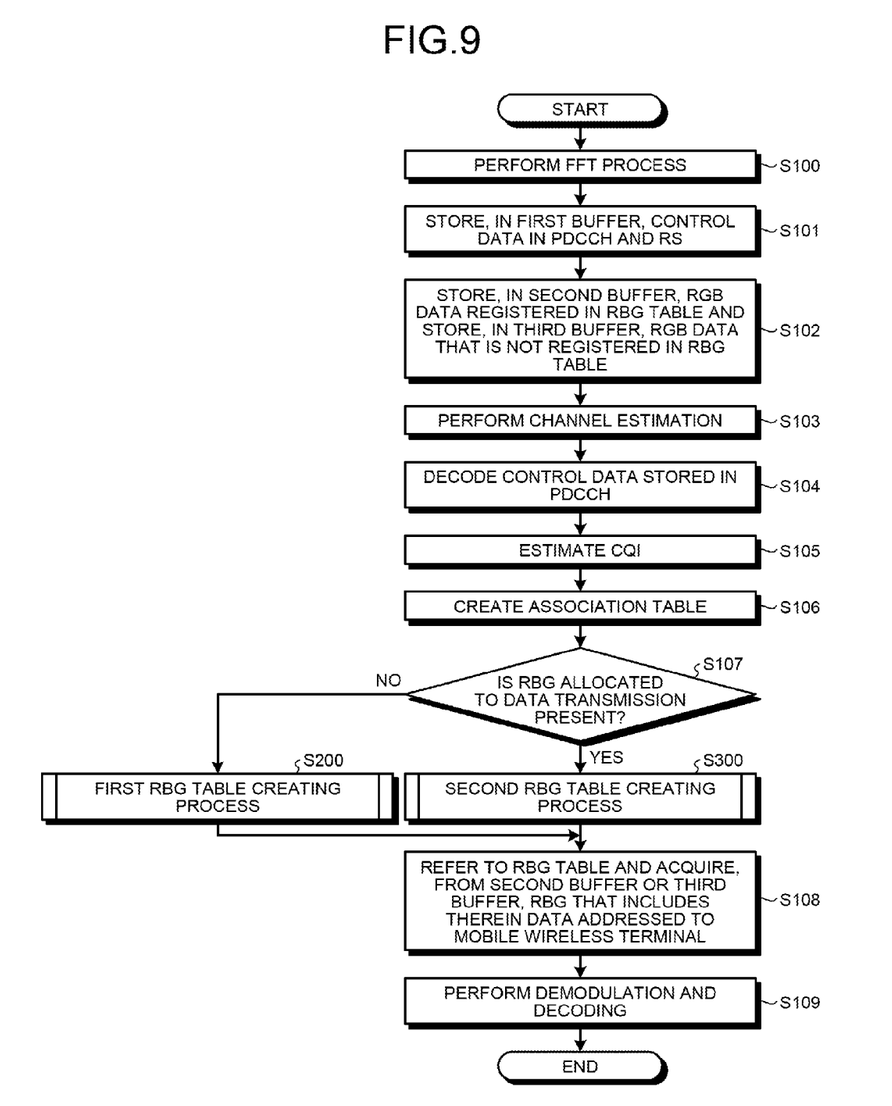
FIG. 9 is a flowchart illustrating an example of a receiving process.

FIG. 9 is a flowchart illustrating an example of a receiving process. The communication processor 20 starts the operation indicated in the flowchart for each timing of, for example, a subframe.

First, the FFT unit 21 performs the FFT process on the received signal that has been sent from the RF unit 12 (Step S100) and sends the processed received signal to the DMPX 22. The DMPX 22 extracts, from the received signal after the FFT process, the pieces of the control data in the PDCCH and in the RS and stores the data in the first buffer 240 (Step S101). Then, the DMPX 22 sends, to the DMPX 23, the received signal from which the pieces of the control data in the PDCCH and in the RS are removed.

Then, the DMPX 23 stores, in the second buffer 241, the pieces of the data that are included in the signal received from the DMPX 22 and that have been received via the RBG that is registered in the RBG table 35. Furthermore, the DMPX 23 stores, in the third buffer 130, the pieces of the data that are included in the received signal received from the DMPX 22 and that have been received from the RBG that is not registered in the RBG table 35 (Step S102). The RBG table 35 that is referred to by the DMPX 23 at Step S102 is the RBG table 35 that was created in a first RBG table creating process (Step S200) or a second RBG table creating process (Step S300), which will be described later, for the duration of the previous subframe.

Then, the channel estimating unit 26 calculates, for all of the SCs, a channel estimated value that indicates the state of a channel used for a wireless transmission path from the cross correlation between the RSs stored in the first buffer 240 and the already known signal (Step S103). Then, the channel estimating unit 26 sends the calculated channel estimated value to the control signal detecting unit 25, the demodulating unit 27, and the CQI estimating unit 28.

Then, the control signal detecting unit 25 demodulates and decodes, for each RB, the control data included in the PDCCH stored in the first buffer 240 by using the channel estimated value calculated by the channel estimating unit 26 (Step S104). The control signal detecting unit 25 sends, to the demodulating unit 27 and the RBG table creating unit 29, the identification information related to the RB allocated to the transmission of data to the mobile wireless terminal 10.

Furthermore, if it is time to measure the CQI instructed by the base station, the CQI estimating unit 28 measures the quality of each of the RBGs by using the channel estimated value calculated by the channel estimating unit 26. Then, the CQI estimating unit 28 estimates, for each RBG, the CQI that indicates the measured quality (Step S105). Then, the CQI estimating unit 28 sends the CQI that was estimated for each RBG to the RBG table creating unit 29.

The RBG table creating unit 29 receives the identification information on the RB from the control signal detecting unit 25 and receives the CQI for each RBG from the CQI estimating unit 28. Then, the RBG table creating unit 29 creates the association table 30 illustrated in, for example, FIG. 5 (Step S106).

Then, the RBG table creating unit 29 refers to the created association table 30 and determines whether an RBG allocated to the transmission of data to the mobile wireless terminal 10 is present (Step S107). If no RBG allocated to the transmission of data to the mobile wireless terminal 10 is present (No at Step S107), the RBG table creating unit 29 performs the first RBG table creating process (Step S200), which will be described later, and the demodulating unit 27 performs the process at Step S108.

If an RBG allocated to the transmission of data to the mobile wireless terminal 10 is present (Yes at Step S107), the RBG table creating unit 29 performs the second RBG table creating process (Step S300), which will be described later.

Then, the demodulating unit 27 refers to the RBG table 35 that has been received from the RBG table creating unit 29 and acquires, from the second buffer 241 or the third buffer 130, data in the RBG that includes therein the RB that is associated with the identification information received from the control signal detecting unit 25 (Step S108). Then, the demodulating unit 27 demodulates and decodes the acquired data in the RBG by using the channel estimated value that is received from the channel estimating unit 26 (Step S109) and the communication processor 20 ends the operation illustrated in the flowchart.

First RBG Table Creating Process

Figure 10:
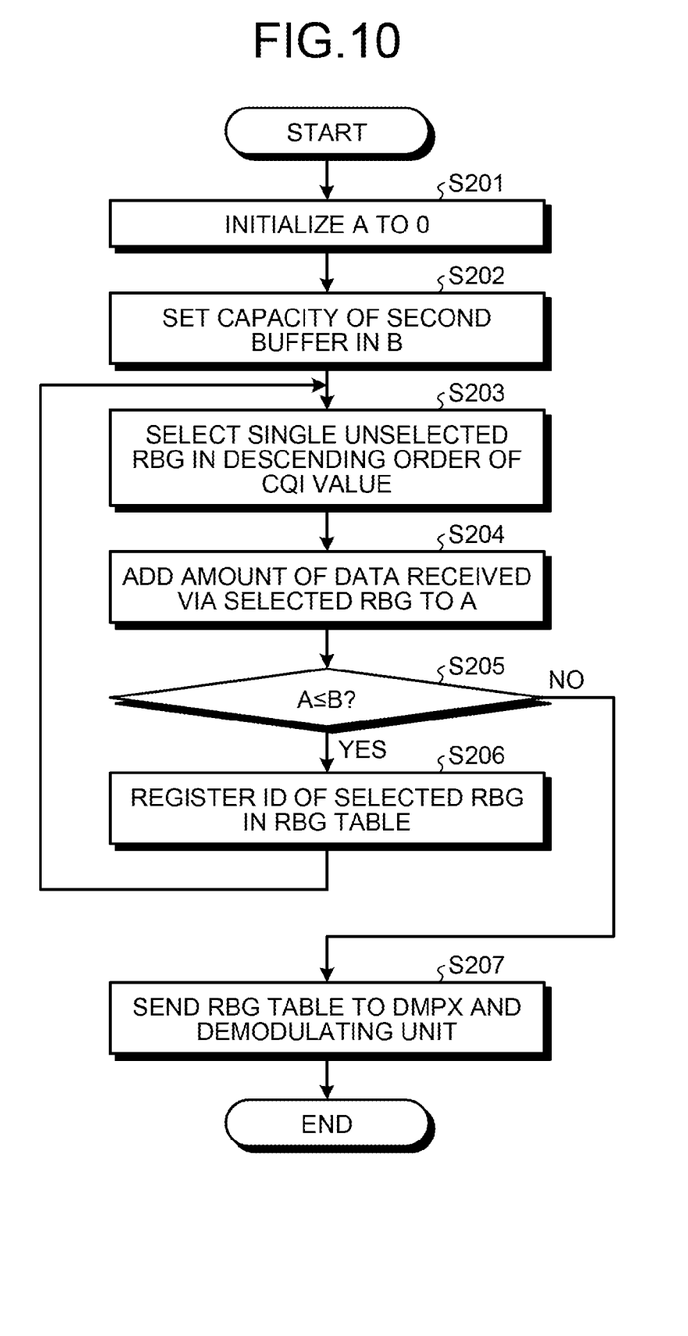
FIG. 10 is a flowchart illustrating an example of a first RBG table creating process performed at Step S200.

FIG. 10 is a flowchart illustrating an example of a first RBG table creating process performed at Step S200.

First, the RBG table creating unit 29 initializes a variable A that indicates the cumulative value of the amount of the data received via an RBG to 0 (Step S201). Then, the RBG table creating unit 29 sets a value of the capacity of the second buffer 241 in a variable B that indicates the capacity of the second buffer 241 (Step S202).

Then, the RBG table creating unit 29 refers to the association table 30 and sequentially selects a single unselected RBG in descending order of the CQI values (Step S203). Then, the RBG table creating unit 29 adds the amount of data received via the selected RBG to the variable A (Step S204).

Then, the RBG table creating unit 29 determines whether the variable A is equal to or less than the variable B (Step S205). A case in which the variable A is equal to or less than the variable B means that the cumulative value of the amount of data received via the selected RBG is less than the capacity of the second buffer 241 and means that all of the pieces of the data received via the selected RBG can be stored in the second buffer 241.

If the variable A is equal to or less than the variable B (Yes at Step S205), the RBG table creating unit 29 registers, in the RBG table 35, the ID of the RBG that was selected at Step S203 (Step S206). Then, the RBG table creating unit 29 again performs the process at Step S203.

If the variable A is greater than the variable B (No at Step S205), the RBG table creating unit 29 sends the data in the RBG table 35 to the DMPX 23 and the demodulating unit 27 (Step S207). Then, the communication processor 20 ends the first RBG table creating process indicated in the flowchart.

Second RBG Table Creating Process

Figure 11:
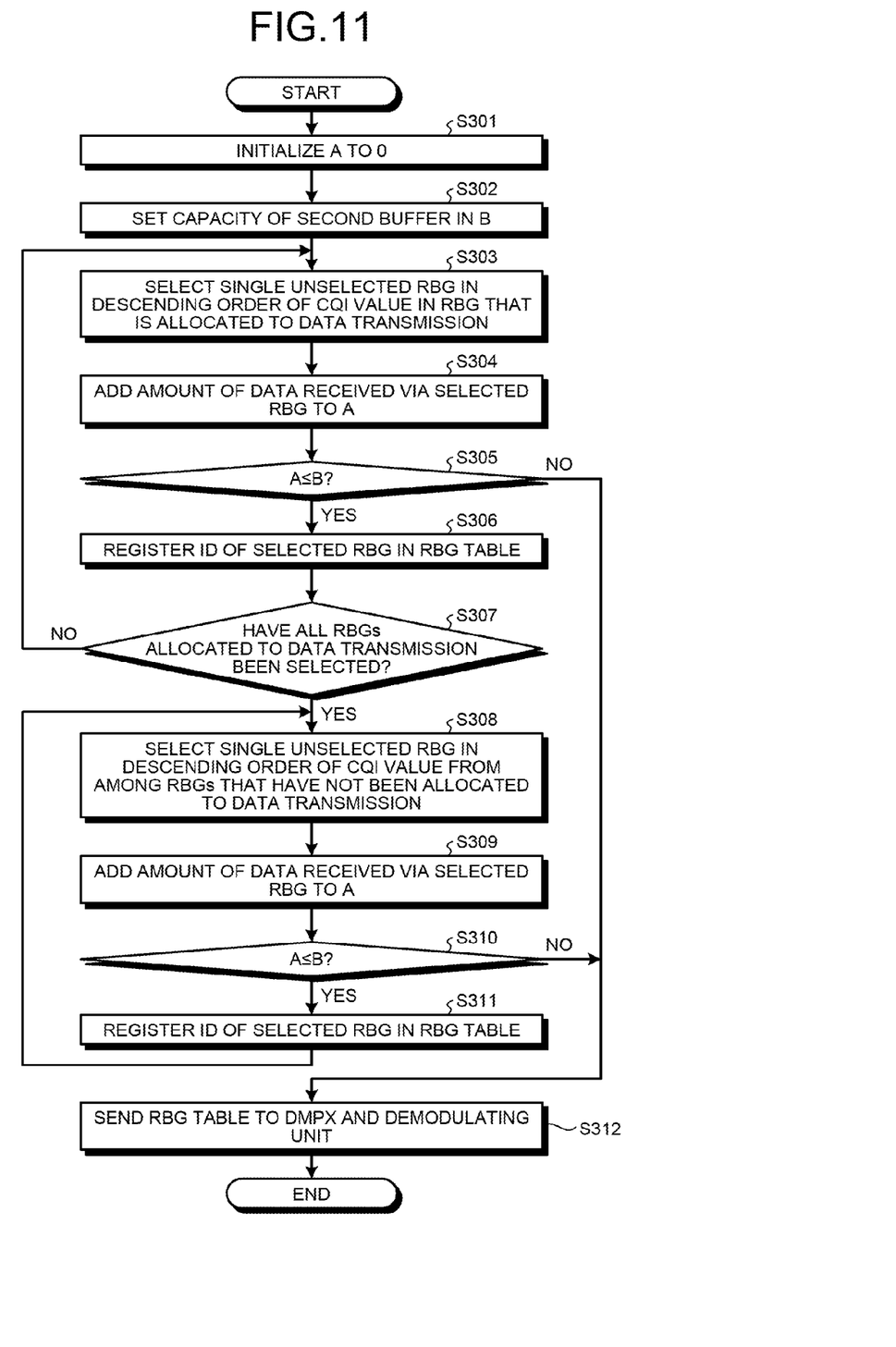
FIG. 11 is a flowchart illustrating an example of a second RBG table creating process performed at Step S300.

FIG. 11 is a flowchart illustrating an example of a second RBG table creating process performed at Step S300.

First, the RBG table creating unit 29 initializes the variable A that indicates the cumulative value of the amount of data received via the RBG to 0 (Step S301). Furthermore, the RBG table creating unit 29 sets the value of the capacity of the second buffer 241 in the variable B that indicates the capacity of the second buffer 241 (Step S302).

Then, the RBG table creating unit 29 refers to the association table 30 and sequentially selects a single unselected RBG in descending order of the CQI values in the RBG that is allocated to the transmission of data to the mobile wireless terminal 10 (Step S303). Then, the RBG table creating unit 29 adds the amount of data received via the selected RBG to the variable A (Step S304).

Then, the RBG table creating unit 29 determines whether the variable A is equal to or less than the variable B (Step S305). If the variable A is equal to or less than the variable B (Yes at Step S305), the RBG table creating unit 29 registers, in the RBG table 35, the ID of the RBG that has been selected at Step S303 (Step S306). Then, the RBG table creating unit 29 refers to the association table 30 and determines whether all of the RBGs allocated to the transmission of data to the mobile wireless terminal 10 have been selected (Step S307). If an unselected RBG is present in the RBGs that have been allocated to the transmission of data (No at Step S307), the RBG table creating unit 29 again performs the process at Step S303.

If all of the RBGs that have been allocated to the transmission of data are selected (Yes at Step S307), the RBG table creating unit 29 selects a single unselected RBG in descending order of the CQI values from among the RBGs that have not been allocated to the transmission of data to the mobile wireless terminal 10 (Step S308). Then, the RBG table creating unit 29 adds the amount of data received via the selected RBG to the variable A (Step S309).

Then, the RBG table creating unit 29 determines whether the variable A is equal to or less than the variable B (Step S310). If the variable A is equal to or less than the variable B (Yes at Step S310), the RBG table creating unit 29 registers the ID of the RBG selected at Step S308 in the RBG table 35 (Step S311). Then, the RBG table creating unit 29 again performs the process at Step S308.

If the variable A is greater than the variable B (No at Step S305 and No at Step S310), the RBG table creating unit 29 sends the RBG table 35 to the DMPX 23 and the demodulating unit 27 (Step S312). Then, the communication processor 20 ends the second RBG table creating process indicated in the flowchart.

Advantage of the Embodiment

As described above, with the mobile wireless terminal 10 according to the embodiment, electrical power consumed by the mobile wireless terminal 10 in the receiving process can be suppressed.

Furthermore, with the mobile wireless terminal 10 according to the embodiment, data in an RBG with a large CQI value is stored in, instead of the third buffer 130 in the external memory 13, the second buffer 241 in the internal memory 24. Consequently, it is possible to increase the probability that data sent to the mobile wireless terminal 10 is stored in the second buffer 241. Consequently, the probability of accessing the external memory 13 can be reduced in the demodulation process performed on the data and thus the electrical power consumed by the mobile wireless terminal 10 can be suppressed.

Furthermore, with the mobile wireless terminal 10 according to the embodiment, multiple RBGs are specified in descending order of the CQI values such that the sum of the amount of data is the maximum within the range of the capacity of the second buffer 241 and then the data in the specified RBGs are stored in the second buffer 241. Consequently, it is possible to increase the probability that the data sent to the mobile wireless terminal 10 is stored in the second buffer 241.

Furthermore, with the mobile wireless terminal 10 according to the embodiment, data in an RBG with a large CQI value is stored in the second buffer 241 in the internal memory 24 and data in an RBG with a small CQI value is stored in the third buffer 130 in the external memory 13. Consequently, even if data sent to the mobile wireless terminal 10 is not stored in the second buffer 241, the data sent to the mobile wireless terminal 10 can be acquired from the third buffer 130.

Furthermore, with the mobile wireless terminal 10 according to the embodiment, data in an RBG that includes therein an RB that is allocated to transmission of data to the mobile wireless terminal 10 is stored in the second buffer 241 with priority. Consequently, it is possible to increase the probability that the data sent to the mobile wireless terminal 10 is stored in the second buffer 241.

Furthermore, with the mobile wireless terminal 10 according to the embodiment, if not all of the pieces of data in the RBG that includes therein the RB that is allocated to the transmission of data to the mobile wireless terminal 10 are stored in the second buffer 241, the data in the RBG with a large CQI value in the subject RBG is stored in the second buffer 241. Consequently, if an amount of data sent to the mobile wireless terminal 10 is decreased and the amount of data can be stored in the second buffer 241, the possibility that the data sent to the mobile wireless terminal 10 is stored in the second buffer 241 is increased. Consequently, if an amount of data sent to the mobile wireless terminal 10 is decreased in the demodulation process performed on the data, it is possible to reduce the probability of accessing the external memory 13.

Modification

The technology disclosed in the application is not limited to the embodiment described above; however, various modifications are possible as long as they do not depart from the spirit of the application.

For example, in the embodiment described above, the DMPX 23 stores, in the second buffer 241, the RBG data whose identification information is stored in the RBG table 35 and stores, in the third buffer 130, the other pieces of data. However, the technology disclosed in the application is not limited thereto. For example, for the RBGs that are associated with CQI with a threshold equal to or greater than a predetermined threshold, the RBG table creating unit 29 may also register, in the RBG table 35, both the identification information on the RBG to be stored in the second buffer 241 and the identification information on the RBG to be stored in the third buffer 130. In this case, for the data that has been received via an RBG whose identification information has not been registered in the RBG table 35, the DMPX 23 discards the data without storing the data in the second buffer 241 and the third buffer 130.

Figure 12:
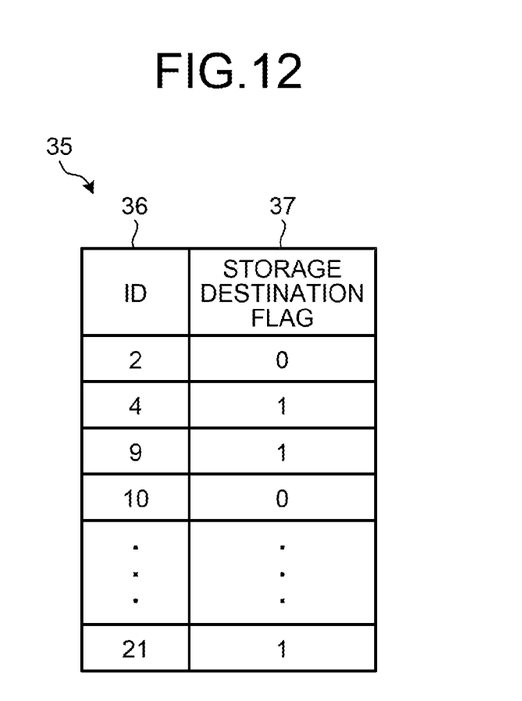
FIG. 12 is a schematic diagram illustrating another example of the RBG table.

FIG. 12 is a schematic diagram illustrating another example of the RBG table 35. As illustrated in FIG. 12, in the RBG table 35 according to the modification, a storage destination flag 37 that indicates the storage destination of the data received via an RBG is stored by being associated with an ID 36 that is used to identify an RBG. If the storage destination is the second buffer 241, for example, 1 is stored in the storage destination flag 37. If the storage destination is the third buffer 130, for example, 0 is stored in the storage destination flag 37.

In the modification, for example, at Step S203 in the first RBG table creating process illustrated in FIG. 10, for the RBGs that are associated with the CQI values that are equal to or greater than a predetermined threshold, the RBG table creating unit 29 sequentially selects a single unselected RBG in descending order of the CQI values. Furthermore, at Step S206, the RBG table creating unit 29 registers, in the RBG table 35, the identification information on the RBG that has been selected at Step S203 together with a value, such as 1, that indicates that the storage destination is the second buffer 241. Furthermore, at Step S207, from among the RBGs associated with the values that are equal to or greater than the predetermined threshold, the RBG table creating unit 29 specifies identification information on an RBG that has not been registered in the RBG table 35. Then, the RBG table creating unit 29 further registers, in the RBG table 35, the specified identification information on the RBG together with a value, such as 0, that indicates that the storage destination is the third buffer 130.

Furthermore, for example, at Step S303 in the second RBG table creating process illustrated in FIG. 11, for the RBGs that are associated with the CQI values that are equal to or greater than the predetermined threshold and that are allocated to the transmission of data, the RBG table creating unit 29 sequentially selects a single unselected RBG in descending order of the CQI values. Furthermore, at Step S306, the RBG table creating unit 29 registers, in the RBG table 35, the identification information on the RBGs selected at Step S303 together with the value indicating that the storage destination is the second buffer 241.

Furthermore, at Step S308, for the RBGs associated with the CQI values that are equal to or greater than the predetermined threshold, the RBG table creating unit 29 sequentially selects a single unselected RBG in descending order of the CQI values from among the RBGs that have not been allocated to the transmission of data to the mobile wireless terminal 10. Furthermore, at Step S311, the RBG table creating unit 29 registers, in the RBG table 35, the identification information on the RBGs selected at Step S303 together with the value indicating that the storage destination is the second buffer 241.

Furthermore, at Step S312, the RBG table creating unit 29 specifies the identification information on the RBG that has not been registered in the RBG table 35 from among the RBGs associated with the CQI values that are equal to or greater than the predetermined threshold. Then, the RBG table creating unit 29 further registers, in the RBG table 35, the specified identification information related to the RBGs together with the value indicating that the storage destination is the third buffer 130.

There is a low probability that the RBG with a small CQI value, i.e., with a low quality, is allocated to the transmission of data to the mobile wireless terminal 10. Accordingly, the data received via the RBG that is associated with the CQI value that is less than the predetermined threshold is not stored in the second buffer 241 and the third buffer 130. This makes it possible to suppress an increase electrical power consumed due to data stored in the third buffer 130.

The threshold of the CQI value may also be a value indicating, for example, 60% of all of the RBGs that are associated with the CQI values that are equal to or greater than the threshold. If 25 RBGs are included in a CC, 60% of all of the RBGs corresponds to 15 RBGs in, for example, descending order of the CQI values. Furthermore, the threshold used for the CQI value may also appropriately be changed in accordance with distribution of CQI in all of the RBGs. For example, the threshold used for the CQI value may also be the average value of the CQI values of all of the RBGs.

Furthermore, in the embodiment described above, the DMPX 23 stores, in the second buffer 241 with priority, the data in the RBG that includes therein the RB allocated to the transmission of data. Then, if free space is present in the second buffer 241, the DMPX 23 stores, in the second buffer 241, data in an RBG that has a large CQI value and that has not been allocated to the transmission of data. Then, the DMPX 23 stores, in the third buffer 130, the rest of the pieces of data that is not stored in the second buffer 241. However, the disclosed technology is not limited thereto.

For example, if the DMPX 23 stores, in the second buffer 241, all of the pieces of data in an RBG that includes therein an RB that is allocated to the transmission of data, the DMPX 23 may also discard the rest of the pieces of data in the RBG that is not stored in the second buffer 241, instead of storing the rest of the data in the third buffer 130. Consequently, it is possible to reduce the electrical power consumed by an access to the third buffer 130 due to the data being stored. There is a low probability that the RBG that is not allocated to the transmission of data to the mobile wireless terminal 10 and that has a small CQI value is used for the transmission of data to the mobile wireless terminal 10. Accordingly, even if the data received via this kind of RBG is discarded, the probability of the occurrence of a reception error of the data is low.

Furthermore, in the embodiment described above, the RBG table creating unit 29 stores, in the second buffer 241, identification information related to an RBG that includes therein an RB allocated to the transmission of data to the mobile wireless terminal 10 by giving priority higher than the data in the RBG with a greater CQI value. However, the disclosed technology is not limited thereto. For example, pieces of data received via the RBGs may also be stored, in the second buffer 241 with priority, in the descending order of the CQI values for the RBG regardless of whether an RB allocated to the transmission of data to the mobile wireless terminal 10 is included.

According to an aspect of an embodiment of the application, an advantage is provided in that electrical power consumed by a mobile wireless terminal can be reduced in a receiving process.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile wireless terminal comprising;
    a communication processor;
    an internal memory that is arranged inside the communication processor and that includes a first buffer; and
    an external memory that is arranged outside the communication processor and that includes a second buffer, wherein
    the communication processor includes
        a measuring unit that measures quality of channels for each channel,
        a specifying unit that specifies a plurality of channels in descending order of quality of the channels within a range in which a sum of an amount of data received via the channels is equal to or less than a capacity of the first buffer included in the internal memory, and
        a storing unit that stores, in the first buffer included in the internal memory, data received via the plurality of channels specified by the specifying unit and that stores, in the second buffer included in the external memory, data received via the channel that is not specified by the specifying unit.

2. The mobile wireless terminal according to claim 1, wherein the specifying unit specifies, in descending order of quality of the channels, the plurality of channels such that the sum of the amount of data received via the channel is a maximum within the range of the capacity of the first buffer.

3. The mobile wireless terminal according to claim 1, further comprising:
    a detecting unit that detects allocation information that indicates information related to the channel that is allocated to transmission of data; and
    a demodulating unit that acquires, from the first buffer or the second buffer, data received via the channel indicated by the allocation information and that demodulates data that is acquired, wherein
    when the sum of the amount of data received via the channels indicated by the allocation information is less than the capacity of the first buffer, the specifying unit sequentially specifies the plurality of channels in descending order of quality of the channels within the range in which, from among the channels that are not indicated by the allocation information, the sum of the amount of data received via the channels that are not indicated by the allocation information is equal to or less than a rest of the capacity of the first buffer that is obtained by subtracting the sum of the amount of data received via the channels indicated by the allocation information from the capacity of the first buffer, and the storing unit stores, in the first buffer, data received via the channels indicated by the allocation information and data received via the plurality of the channels specified by the specifying unit.

4. The mobile wireless terminal according to claim 3, wherein, when the sum of the amount of data received via the channels indicated by the allocation information exceeds the capacity of the first buffer, the specifying unit specifies the plurality of channels in descending order of quality of the channels within the range in which, from among the channels indicated by the allocation information, the sum of the amount of data received via the channels indicated by the allocation information is equal to or less than the capacity of the first buffer.

5. The mobile wireless terminal according to claim 3, wherein, when the sum of the amount of data received via the channels indicated by the allocation information is less than the capacity of the first buffer, the storing unit discards data received via the channel that is not indicated by the allocation information and that is not specified by the specifying unit.

6. The mobile wireless terminal according to claim 1, wherein the specifying unit specifies the plurality of channels from among the channels in which the quality is equal to or greater than a predetermined threshold, and the storing unit discards data received via the channel in which the quality is less than the threshold.

7. The mobile wireless terminal according to claim 6, wherein the threshold is appropriately changed in accordance with distribution of the quality among the channels.

8. A buffer control method performed by a communication processor that includes therein an internal memory, the buffer control method comprising:

measuring quality of channels for each channel;

specifying a plurality of channels in descending order of quality of the channels within a range in which a sum of an amount of data received via the channels is equal to or less than a capacity of a first buffer that is included in the internal memory;

storing, in the first buffer included in the internal memory, data received via the specified plurality of channels; and storing, in a second buffer included in an external memory arranged outside the communication processor, data received via the channel that is not specified.

* * * * *